United States Patent
Hwang

(10) Patent No.: US 9,574,655 B2
(45) Date of Patent: Feb. 21, 2017

(54) HYDRAULIC PRESSURE SUPPLY SYSTEM OF AUTOMATIC TRANSMISSION FOR VEHICLE

(71) Applicant: Hyundai Motor Company, Seoul (KR)

(72) Inventor: Jin Young Hwang, Busan (KR)

(73) Assignee: Hyundai Motor Company, Seoul (KR)

( * ) Notice: Subject to any disclaimer, the term of this patent is extended or adjusted under 35 U.S.C. 154(b) by 103 days.

(21) Appl. No.: 14/524,997

(22) Filed: Oct. 27, 2014

(65) Prior Publication Data

US 2015/0167835 A1 Jun. 18, 2015

(30) Foreign Application Priority Data

Dec. 18, 2013 (KR) ........................ 10-2013-0158825

(51) Int. Cl.
*F16H 61/00* (2006.01)
*B60K 6/48* (2007.10)
(Continued)

(52) U.S. Cl.
CPC ............. *F16H 61/0031* (2013.01); *B60K 6/48* (2013.01); *F04B 23/08* (2013.01); *F04B 49/24* (2013.01);
(Continued)

(58) Field of Classification Search
CPC ............. F15B 2211/20592; B60K 6/48; F16H 61/0031; F16H 57/0441; F04B 23/08; F04B 49/24; Y10T 137/86163; Y10T 137/86139
See application file for complete search history.

(56) References Cited

U.S. PATENT DOCUMENTS 7,107,870 B2 * 9/2006 Kuhstrebe ......... B60W 30/1819
74/335
8,322,135 B2 * 12/2012 Kure .................... E02F 9/2242
60/422

(Continued)

FOREIGN PATENT DOCUMENTS

EP          1 722 121 A1    11/2006
JP       2010-133509 A       6/2010
(Continued)

*Primary Examiner* — Atif Chaudry
(74) *Attorney, Agent, or Firm* — Morgan, Lewis & Bockius LLP

(57) ABSTRACT

A hydraulic pressure supply system of an automatic transmission for a vehicle may include a low-pressure hydraulic pump, a low-pressure regulator valve, a high-pressure hydraulic pump, a high-pressure regulator valve regulating the high hydraulic pressure supplied from the high-pressure hydraulic pump to be stable hydraulic pressure and supplying the regulated hydraulic pressure to the high pressure portion, a first switch valve disposed between the low-pressure hydraulic pump and the low-pressure regulator valve, and selectively communicating the low-pressure hydraulic pump to the low-pressure regulator valve, a second switch valve selectively opening or closing a first circulating line connecting a downstream of the low-pressure hydraulic pump to an upstream of the high-pressure regulator valve, and a third switch valve selectively opening or closing a second circulating line connecting a downstream of the high-pressure regulator valve to an upstream of the low-pressure regulator valve.

12 Claims, 4 Drawing Sheets

(51) Int. Cl.
*F04B 23/08* (2006.01)
*F16H 57/04* (2010.01)
*F04B 49/24* (2006.01)
*F16H 61/02* (2006.01)

(52) U.S. Cl.
CPC . *F16H 57/0441* (2013.01); *B60Y 2300/18016* (2013.01); *F15B 2211/20592* (2013.01); *F16H 61/0267* (2013.01); *F16H 2061/0037* (2013.01); *F16H 2312/14* (2013.01); *Y10T 137/8601* (2015.04); *Y10T 137/86139* (2015.04); *Y10T 137/86163* (2015.04)

(56) References Cited

U.S. PATENT DOCUMENTS

| | | | | |
|---|---|---|---|---|
| 2005/0263352 | A1* | 12/2005 | Fideler | F16H 57/0434 184/6.1 |
| 2006/0065217 | A1* | 3/2006 | Ikegawa | F01M 1/02 123/41.42 |
| 2007/0107421 | A1* | 5/2007 | Emmert | F15B 11/17 60/435 |
| 2008/0035443 | A1* | 2/2008 | De Maziere | F16D 25/123 192/3.57 |
| 2008/0179158 | A1* | 7/2008 | De Maziere | F16D 25/123 192/58.6 |
| 2009/0232673 | A1 | 9/2009 | Reisch et al. | |
| 2010/0204008 | A1* | 8/2010 | Azuma | F16H 41/30 477/115 |
| 2010/0281859 | A1* | 11/2010 | Oka | E02F 9/2246 60/459 |
| 2010/0287924 | A1* | 11/2010 | Dostal | F15B 11/17 60/430 |
| 2011/0173965 | A1* | 7/2011 | Holmes | F16H 61/0031 60/456 |
| 2012/0040792 | A1* | 2/2012 | Ito | F16H 61/0025 475/115 |
| 2012/0085441 | A1* | 4/2012 | Park | F16H 61/0025 137/565.11 |

FOREIGN PATENT DOCUMENTS

| | | |
|---|---|---|
| JP | 2013-24381 A | 2/2013 |
| KR | 10-1251504 B1 | 4/2013 |
| KR | 10-2013-0060044 A | 6/2013 |
| KR | 10-1338455 B1 | 12/2013 |

* cited by examiner

HYDRAULIC PRESSURE SUPPLY SYSTEM OF AUTOMATIC TRANSMISSION FOR VEHICLE

CROSS-REFERENCE TO RELATED APPLICATION

The present application claims priority to Korean Patent Application No. 10-2013-0158825 filed Dec. 18, 2013, the entire contents of which is incorporated herein for all purposes by this reference.

BACKGROUND OF THE INVENTION

Field of the Invention

The present invention relates to a hydraulic pressure supply system of an automatic transmission for a vehicle. More particularly, the present invention relates to a hydraulic pressure supply system of an automatic transmission for a vehicle which executes idle stop and go (ISG) function safely by supplying prefill hydraulic pressure to a high pressure portion through a high-pressure hydraulic pump when a vehicle stops and improves reliability through fail-safe function when the high-pressure hydraulic pump is out of order.

Description of Related Art

Recently, vehicle makers direct all their strength to improve fuel economy due to worldwide high oil prices and strengthening of exhaust gas regulations.

Improvement of fuel economy may be achieved by improving power delivery efficiency, and the improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Therefore, fuel economy may be improved by minimizing power consumption for driving the hydraulic pump, and noise and vibration may be reduced and durability may be improved by reducing load applied to the hydraulic pump.

Since hydraulic pressure generated by the low-pressure hydraulic pump is supplied to the high-pressure hydraulic pump and is then increased according to a conventional hydraulic pressure supply system, the hydraulic pressure supplied to the high pressure portion is insufficient and a vehicle cannot run if the high-pressure hydraulic pump is out of order.

Since the low-pressure hydraulic pump is stopped in a case that the engine is stopped, the hydraulic pressure is not supplied to the high-pressure hydraulic pump and the conventional hydraulic pressure supply system is hard to apply to the vehicle including an idle stop and go (ISG) system.

The vehicle including ISG system means a vehicle where the engine stops if the vehicle stops and the engine is started again if the vehicle start to run so as to reduce fuel usage and emission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of executing idle stop and go (ISG) function safely by supplying prefill hydraulic pressure to a high pressure portion through a high-pressure hydraulic pump when a vehicle stops and improving reliability through fail-safe function when the high-pressure hydraulic pump is out of order.

According to various aspects of the present invention, a hydraulic pressure supply system of an automatic transmission for a vehicle which generates a low hydraulic pressure and a high hydraulic pressure using oil stored in an oil pan and supplies the low hydraulic pressure and the high hydraulic pressure respectively to a low pressure portion and a high pressure portion may include a low-pressure hydraulic pump generating the low hydraulic pressure using the oil stored in the oil pan, a low-pressure regulator valve regulating the low hydraulic pressure supplied from the low-pressure hydraulic pump to be stable hydraulic pressure and supplying the regulated hydraulic pressure to the low pressure portion, a high-pressure hydraulic pump increasing the low hydraulic pressure supplied from the low-pressure hydraulic pump to generate the high hydraulic pressure and supplying the high hydraulic pressure, a high-pressure regulator valve regulating the high hydraulic pressure supplied from the high-pressure hydraulic pump to be stable hydraulic pressure and supplying the regulated hydraulic pressure to the high pressure portion, a first switch valve disposed between the low-pressure hydraulic pump and the low-pressure regulator valve, and selectively communicating the low-pressure hydraulic pump to the low-pressure regulator valve, a second switch valve selectively opening or closing a first circulating line connecting a downstream of the low-pressure hydraulic pump to an upstream of the high-pressure regulator valve, and a third switch valve selectively opening or closing a second circulating line connecting a downstream of the high-pressure regulator valve to an upstream of the low-pressure regulator valve.

The low-pressure hydraulic pump may be driven by an engine and the high-pressure hydraulic pump may be driven by an electric motor.

The first switch valve may be controlled by the hydraulic pressure supplied from the downstream of the high-pressure regulator valve and elastic force of a first elastic member counteracting against the hydraulic pressure supplied from the downstream of the high-pressure regulator valve.

The first switch valve may be adapted to communicate the low-pressure hydraulic pump with the low-pressure regulator valve when the hydraulic pressure is supplied from the downstream of the high-pressure regulator valve.

The second switch valve may be controlled by the hydraulic pressure supplied from the upstream of the high-pressure regulator valve and elastic force of a second elastic member counteracting against the hydraulic pressure supplied from the upstream of the high-pressure regulator valve.

The second switch valve may be adapted to close the first circulating line when the hydraulic pressure is supplied from the upstream of the high-pressure regulator valve.

The third switch valve may be controlled by the hydraulic pressure supplied from the downstream of the high-pressure regulator valve and elastic force of a third elastic member counteracting against the hydraulic pressure supplied from the downstream of the high-pressure regulator valve.

The third switch valve may be adapted to close the second circulating line when the hydraulic pressure is supplied from the downstream of the high-pressure regulator valve.

The first switch valve may communicate the low-pressure hydraulic pump with the low-pressure regulator valve, the second switch valve may close the first circulating line, and the third switch valve may close the second circulating line at idle stop.

The first switch valve may communicate the low-pressure hydraulic pump with the low-pressure regulator valve, the second switch valve may close the first circulating line, and the third switch valve may close the second circulating line at normal operation.

The first switch valve may disconnect the low-pressure hydraulic pump and the low-pressure regulator valve, the second switch valve may open the first circulating line, and the third switch valve may open the second circulating line when the high-pressure hydraulic pump is out of order.

The hydraulic pressure supply system may further include a check valve disposed at the upstream of the high-pressure regulator valve and preventing back flow of the hydraulic pressure from the high-pressure regulator valve to the high-pressure hydraulic pump.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
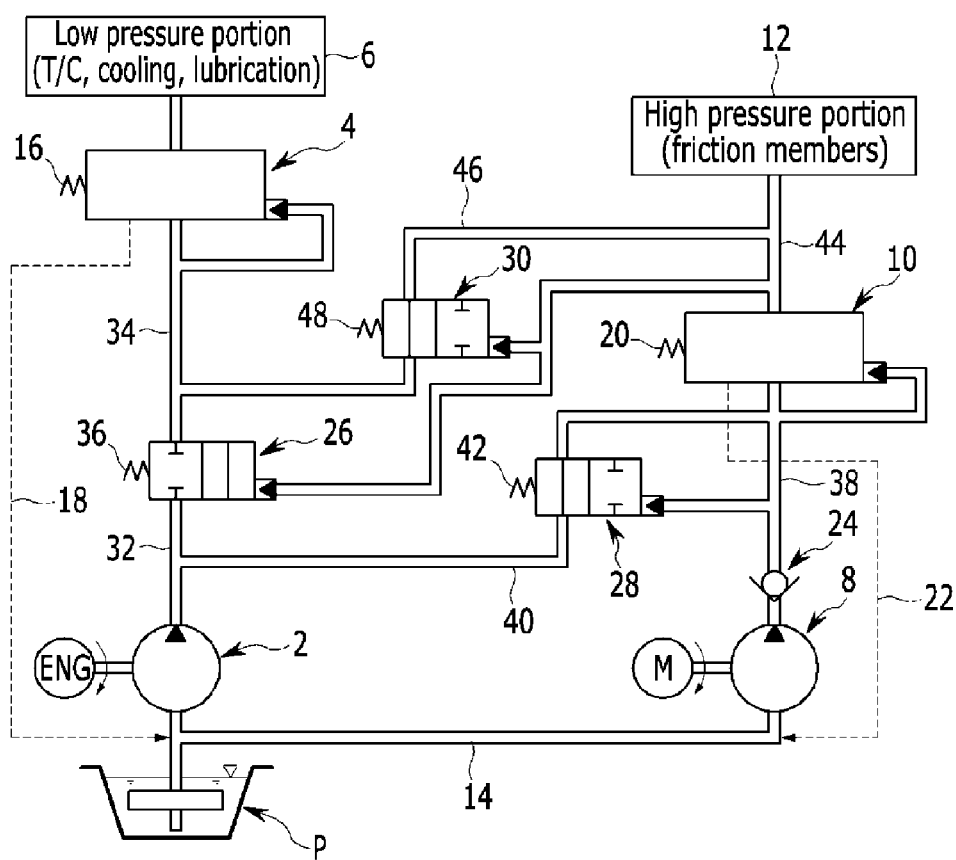
FIG. 1 is a schematic diagram of an exemplary hydraulic pressure supply system according to the present invention.

FIG. 1 is a schematic diagram of a hydraulic pressure supply system according to various embodiments of the present invention.

Referring to FIG. 1, a hydraulic pressure supply system according to various embodiments of the present invention is adapted to supply a low hydraulic pressure generated by a low-pressure hydraulic pump 2 to a low pressure portion 6 such as a torque converter (T/C), a cooling portion, and a lubrication portion through a low-pressure regulator valve 4, and to supply a high hydraulic pressure generated by a high-pressure hydraulic pump 8 to a high pressure portion 12 for operating friction members related to shifting through a high-pressure regulator valve 10.

The low hydraulic pressure is a lower pressure facilitating operation of the torque converter (T/C) and cooling and lubrication, and the high hydraulic pressure is a high pressure facilitating operation of a plurality of friction members.

The low-pressure hydraulic pump 2 and the high-pressure hydraulic pump 8 are connected to an oil pan P through an input line 14, the low-pressure hydraulic pump 2 is driven by an engine ENG, and the high-pressure hydraulic pump 8 is driven by an electric motor M.

The low-pressure regulator valve 4 is controlled by the hydraulic pressure supplied from the low-pressure hydraulic pump 2 and elastic force of an elastic member 16 counteracting against the hydraulic pressure so as to regulate the low hydraulic pressure to be stable hydraulic pressure, supply the regulated hydraulic pressure to the low pressure portion 6, and supply remaining hydraulic pressure to the input line 14 through a first recirculation line 18.

The high-pressure regulator valve 10 is controlled by the hydraulic pressure supplied from the high-pressure hydraulic pump 8 and elastic force of an elastic member 20 counteracting against the hydraulic pressure so as to regulate the high hydraulic pressure to be stable hydraulic pressure, supply the regulated hydraulic pressure to the high pressure portion 12, and supply remaining hydraulic pressure to the input line 14 through a second recirculation line 22.

The elastic force of the elastic member 16 used in the low-pressure regulator valve 4 and the elastic force of the elastic member 20 used in the high-pressure regulator valve 10 are set according respectively to hydraulic pressure demanded at the low pressure portion 6 and the high pressure portion 12.

The hydraulic control system according to the exemplary embodiment of the present invention can handle idle stop state and malfunction of the high-pressure hydraulic pump 8 using one check valve 24 and first, second, and third switch valves 26, 28, and 30.

The check valve 24 prevents back flow of the hydraulic pressure from the high-pressure regulator valve 10 to the high-pressure hydraulic pump 8, and is disposed at a downstream of the high-pressure hydraulic pump 8.

The first switch valve 26 is a spool valve and is adapted to supply the hydraulic pressure supplied from the low-pressure hydraulic pump 2 to the low-pressure regulator valve 4 and selectively to the high pressure portion 12.

For this purpose, the first switch valve 26 is disposed between the first low-pressure line 32 connected to the low-pressure hydraulic pump 2 and the second low-pressure line 34 connected to the low-pressure regulator valve 4.

In addition, the first switch valve 26 is controlled by the hydraulic pressure supplied from a downstream of the high-pressure regulator valve 10 and elastic force of an elastic member 36 counteracting against the hydraulic pressure so as to selectively disconnect or connect the low-pressure hydraulic pump 2 and the low-pressure regulator valve 4.

The second switch valve 28 selectively supplies the hydraulic pressure generated by the low-pressure hydraulic pump 2 to the high-pressure regulator valve 10 when the first switch valve 26 disconnects the low-pressure hydraulic pump 2 and the low-pressure regulator valve 4.

For this purpose, the second switch valve 28 is disposed on a first circulating line 40 connecting the first low-pressure line 32 to the first high-pressure line 38 positioned at an upstream of the high-pressure regulator valve 10.

In addition, the second switch valve 28 is controlled by the hydraulic pressure of the first high-pressure line 38 and elastic force of an elastic member 42 counteracting against the hydraulic pressure of the first high-pressure line 38 so as to selectively supply the hydraulic pressure supplied from the low-pressure hydraulic pump 2 to the high-pressure regulator valve 10.

The third switch valve 30 is adapted to supply the hydraulic pressure of the low-pressure hydraulic pump 2 to the low pressure portion 6 again after the hydraulic pressure of the low-pressure hydraulic pump 2 is supplied to the high pressure portion 12 when the high-pressure hydraulic pump 8 is out of order. That is, the third switch valve 30 is adapted to supply the hydraulic pressure supplied to the high pressure portion 12 selectively to the low-pressure regulator valve 4.

For this purpose, the third switch valve 30 is disposed on a second circulating line 46 connecting the second low-pressure line 34 to the second high-pressure line 44 positioned at a downstream of the high-pressure regulator valve 10.

In addition, the third switch valve 30 is controlled by the hydraulic pressure of the second high-pressure line 44 and elastic force of an elastic member 48 counteracting against the hydraulic pressure of the second high-pressure line 44 so as to selectively supply the hydraulic pressure of the second high-pressure line 44 to the low-pressure regulator valve 4.

Figure 2:
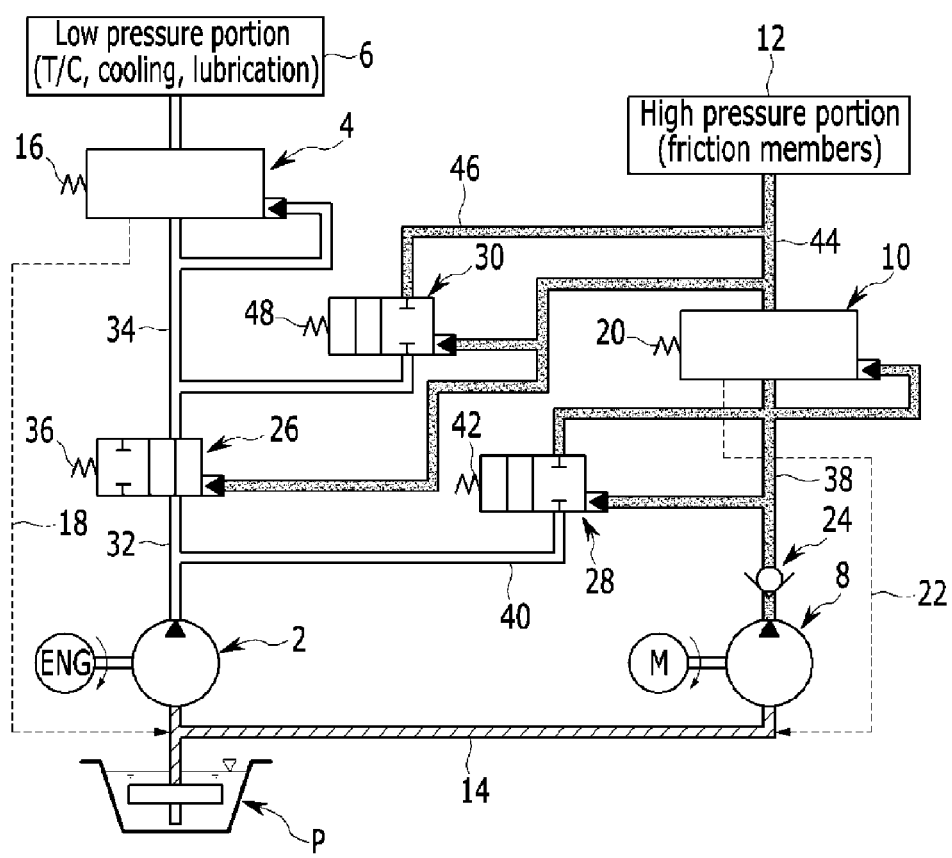
FIG. 2 is a schematic diagram of the exemplary hydraulic pressure supply system illustrating oil flow at idle stop state, according to the present invention.

FIG. 2 is a schematic diagram of a hydraulic pressure supply system according to various embodiments of the present invention illustrating oil flow at idle stop state.

Referring to FIG. 2, if the engine is stopped when the vehicle is stopped, the low-pressure hydraulic pump 2 is also stopped.

At this time, if the high-pressure hydraulic pump 8 is independently operated, prefill hydraulic pressure can be supplied to the high pressure portion 12. Therefore, ISG function may be stably operated.

Since the hydraulic pressure of the first and second high-pressure lines 38 and 44 is supplied to the first, second, and third switch valves 26, 28, and 30 as control pressures thereof at an idle stop, the hydraulic pressure of the high pressure portion 12 is not supplied to the low pressure portion 6.

Figure 3:
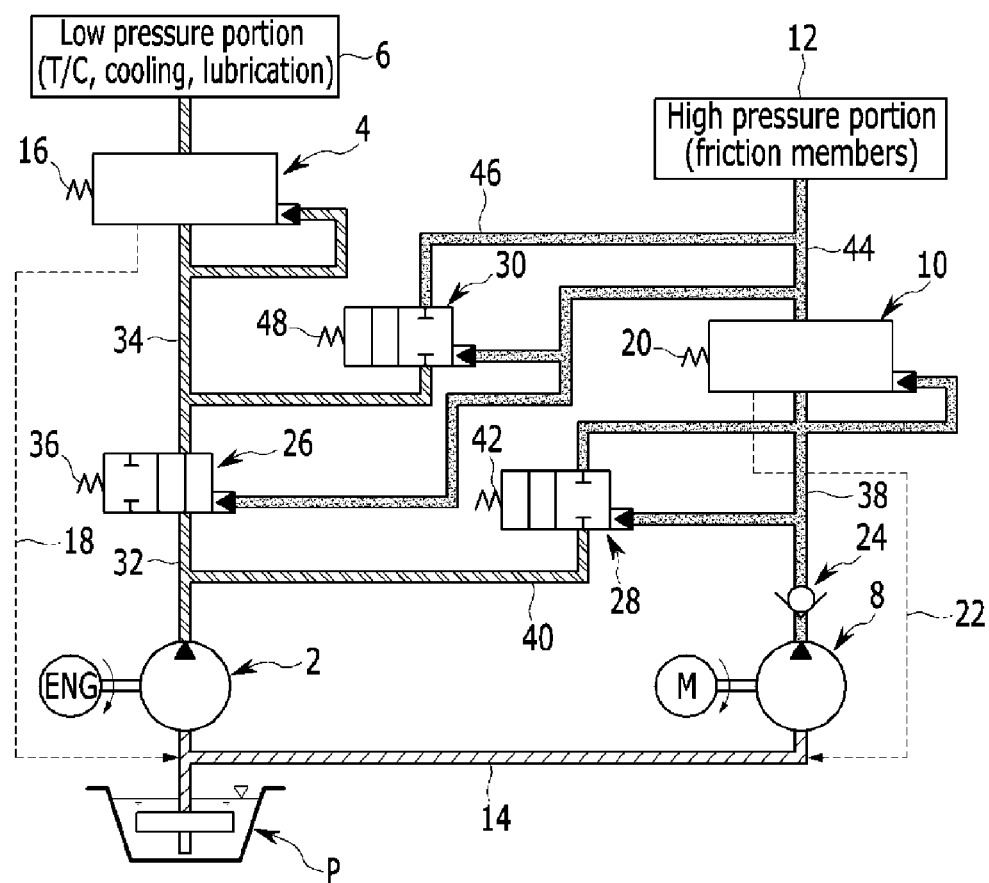
FIG. 3 is a schematic diagram of the exemplary hydraulic pressure supply system illustrating oil flow at normal operation, according to the present invention.

FIG. 3 is a schematic diagram of a hydraulic pressure supply system according to various embodiments of the present invention illustrating oil flow at normal operation.

Referring to FIG. 3, the low hydraulic pressure generated at the low-pressure hydraulic pump 2 is supplied to the low pressure portion 6 through the low-pressure regulator valve 4, and the high hydraulic pressure generated at the high-pressure hydraulic pump 8 is supplied to the high pressure portion 12 through the high-pressure regulator valve 10 when the low-pressure hydraulic pump 2 and the high-pressure hydraulic pump 8 operate normally.

Figure 4:
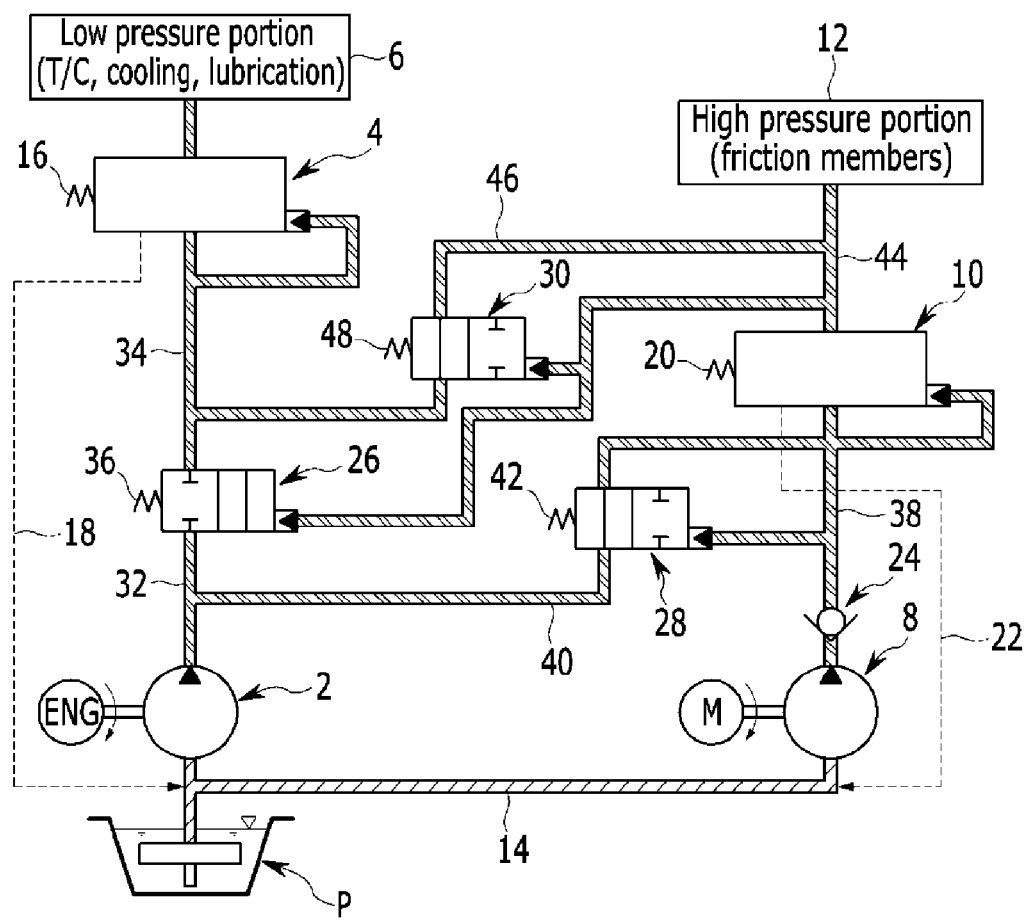
FIG. 4 is a schematic diagram of the exemplary hydraulic pressure supply system illustrating oil flow when a high-pressure hydraulic pump is out of order, according to the present invention.

FIG. 4 is a schematic diagram of a hydraulic pressure supply system according to various embodiments of the present invention illustrating oil flow when a high-pressure hydraulic pump is out of order.

Referring to FIG. 4, the hydraulic pressure generated at the low-pressure hydraulic pump 2 is supplied to the high pressure portion 12 and the low pressure portion 6 when the high-pressure hydraulic pump 8 is out of order.

That is, if the high-pressure hydraulic pump 8 is stopped, the control pressures are not supplied to the first, second, and third switch valves 26, 28, and 30 because the hydraulic pressure is not generated by the high pressure portion 12.

Therefore, the first switch valve 26 disconnects the first and second low-pressure lines 32 and 34, the second switch valve 28 opens the first circulating line 40, and the third switch valve 30 opens the second circulating line 46.

Therefore, the hydraulic pressure generated at the low-pressure hydraulic pump 2 is supplied to the high pressure portion 12 through the first low-pressure line 32, the first circulating line 40 including the second switch valve 28, the first high-pressure line 38, the high-pressure regulator valve 10, and the second high-pressure line 44.

In addition, a portion of the hydraulic pressure of the second high-pressure line 44 is supplied to the low pressure portion 6 through the second circulating line 46 including the third switch valve 30, the second low-pressure line 34, and the low-pressure regulator valve 4.

At this time, the hydraulic pressure supplied to the first high-pressure line 38 is prevented from flowing back to the high-pressure hydraulic pump 8 by the check valve 24.

The various embodiments of the present invention may prevent generation of unnecessary hydraulic pressure by using the low-pressure hydraulic pump and the high-pressure hydraulic pump. Therefore, driving loss of the hydraulic pump may be reduced and fuel economy may be improved.

In addition, since the high hydraulic pressure generated by the high-pressure hydraulic pump is supplied to the high pressure portion including a plurality of friction members directly related to shifting at the idle stop, the high hydraulic pressure is operated as prefill hydraulic pressure for quick shifting when the vehicle starts to run again. Therefore, the various embodiments of the present invention may be used for the vehicle including the ISG system.

In addition, since the hydraulic pressure is prevented from being supplied to the low pressure portion at the idle stop, driving loss of the hydraulic pump may be minimized.

In addition, since the high pressure portion hydraulic pump is driven by the electric motor, rotation speed of the electric motor may be easily controlled according to line pressure of the high pressure portion. Therefore, fuel economy may be greatly enhanced.

Reliability of the hydraulic control system may be enhanced through fail-safe function at malfunction of the high-pressure hydraulic pump.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle generating a low hydraulic pressure and a high hydraulic pressure using oil stored in an oil pan and supplying the low hydraulic pressure and the high hydraulic pressure respectively to a low pressure portion and a high pressure portion, the hydraulic pressure supply system comprising:
   a low-pressure hydraulic pump generating the low hydraulic pressure using the oil stored in the oil pan;
   a low-pressure regulator valve regulating the low hydraulic pressure supplied from the low-pressure hydraulic pump to be stable hydraulic pressure and supplying the regulated hydraulic pressure to the low pressure portion;
   a high-pressure hydraulic pump generating the high hydraulic pressure using the oil Stored in the oil pan and supplying the high hydraulic pressure;
   a high-pressure regulator valve regulating the high hydraulic pressure supplied from the high-pressure hydraulic pump to be stable hydraulic pressure and supplying the regulated hydraulic pressure to the high pressure portion;
   a first switch valve disposed between the low-pressure hydraulic pump and the low-pressure regulator valve, and selectively communicating the low-pressure hydraulic pump to the low-pressure regulator valve;
   a second switch valve selectively opening or closing a first circulating line connecting a downstream of the low-pressure hydraulic pump to an upstream of the high-pressure regulator valve; and
   a third switch valve selectively opening or closing a second circulating line connecting a downstream of the high-pressure regulator valve to an upstream of the low-pressure regulator valve.

2. The hydraulic pressure supply system of claim 1, wherein the low-pressure hydraulic pump is driven by an engine and the high-pressure hydraulic pump is driven by an electric motor.

3. The hydraulic pressure supply system of claim 1, wherein the first switch valve is controlled by the hydraulic pressure supplied from the downstream of the high-pressure regulator valve and elastic force of a first elastic member counteracting against the hydraulic pressure supplied from the downstream of the high-pressure regulator valve.

4. The hydraulic pressure supply system of claim 3, wherein the first switch valve is adapted to communicate the low-pressure hydraulic pump with the low-pressure regulator valve when the hydraulic pressure is supplied from the downstream of the high-pressure regulator valve.

5. The hydraulic pressure supply system of claim 1, wherein the second switch valve is controlled by the hydraulic pressure supplied from the upstream of the high-pressure regulator valve and elastic force of a second elastic member counteracting against the hydraulic pressure supplied from the upstream of the high-pressure regulator valve.

6. The hydraulic pressure supply system of claim 5, wherein the second switch valve is adapted to close the first circulating line when the hydraulic pressure is supplied from the upstream of the high-pressure regulator valve.

7. The hydraulic pressure supply system of claim 1, wherein the third switch valve is controlled by the hydraulic pressure supplied from the downstream of the high-pressure regulator valve and elastic force of a third elastic member counteracting against the hydraulic pressure supplied from the downstream of the high-pressure regulator valve.

8. The hydraulic pressure supply system of claim 7, wherein the third switch valve is adapted to close the second circulating line when the hydraulic pressure is supplied from the downstream of the high-pressure regulator valve.

9. The hydraulic pressure supply system of claim 1, wherein the first switch valve communicates the low-pressure hydraulic pump with the low-pressure regulator valve, the second switch valve closes the first circulating line, and the third switch valve closes the second circulating line at idle stop.

10. The hydraulic pressure supply system of claim 1, wherein the first switch valve communicates the low-pressure hydraulic pump with the low-pressure regulator valve, the second switch valve closes the first circulating line, and the third switch valve closes the second circulating line at normal operation.

11. The hydraulic pressure supply system of claim 1, wherein the first switch valve disconnects the low-pressure hydraulic pump and the low-pressure regulator valve, the second switch valve opens the first circulating line, and the third switch valve opens the second circulating line when the high-pressure hydraulic pump is out of order.

12. The hydraulic pressure supply system of claim 1, further comprising a check valve disposed at the upstream of the high-pressure regulator valve and preventing back flow of the hydraulic pressure from the high-pressure regulator valve to the high-pressure hydraulic pump.

\* \* \* \* \*